United States Patent

[11] 3,593,284

[72] Inventors Alan I. Frank
Philadelphia;
John A. Angeloni, Sr., Norristown; John J. McIntyre, Ardsley; Ronald L. Baracka, Ambler, all of, Pa.

[21] Appl. No. 675,236
[22] Filed Oct. 13, 1967
[45] Patented July 13, 1971
[73] Assignee Scan-Data Corporation
Norristown, Pa.

[54] RETROGRESSIVE SCANNING PATTERN
4 Claims, 10 Drawing Figs.

[52] U.S. Cl. 340/146.3 F, 178/7.7
[51] Int. Cl. G06k 9/12
[50] Field of Search 178/6.8, 7.2, 7.8, 7.7; 315/23, 24, 26; 340/146.3

[56] References Cited

UNITED STATES PATENTS

| | | | |
|---|---|---|---|
| 3,472,959 | 10/1969 | Stillwell | 178/7.7 |
| 3,104,369 | 9/1963 | Rabinow et al. | 340/146.3 |
| 3,159,814 | 12/1964 | Rabinow | 340/146.3 |
| 3,200,195 | 8/1965 | Davies et al. | 178/6.8 |
| 3,239,606 | 3/1966 | Chatten et al. | 178/7.2 |
| 3,379,826 | 4/1968 | Gray | 178/6.8 X |
| 3,418,519 | 12/1968 | Ferrier, Jr., et al. | 315/24 X |

*Primary Examiner*—Maynard R. Wilbur
*Assistant Examiner*—Leo H. Boudreau
*Attorney*—Caesar, Rivise, Bernstein & Cohen

ABSTRACT: A retrogressive scanning pattern for use in a character recognition system having means for scanning a field and means responsive to the field for producing signals in accordance with the lightness or darkness of the area of the field at which the means for scanning is disposed. Control means are also provided for establishing the position on the field where the means for scanning is disposed. The control means also causes the scanning means to move in a retrogressive pattern across said field in both a horizontal and a vertical direction.

INVENTORS.
ALAN I. FRANK
JOHN A. ANGELONI, SR.
JOHN J. McINTYRE
RONALD L. BARACKA

BY Caesar, Rivise, Bernstein & Cohen
ATTORNEYS.

INVENTORS.
ALAN I. FRANK
JOHN A. ANGELONI, SR.
JOHN J. McINTYRE
RONALD L. BARACKA
BY
Caesar, Rivise, Bernstein & Cohen
ATTORNEYS.

INVENTORS.
ALAN I. FRANK
JOHN A. ANGELONI, SR.
JOHN J. McINTYRE
RONALD L. BARACKA
BY
Caesar, Rivise, Bernstein & Cohen
ATTORNEYS.

INVENTORS.
ALAN I. FRANK
JOHN A. ANGELONI, SR.
JOHN J. McINTYRE
RONALD L. BARACKA
BY
Caesar, Rivise, Bernstein & Cohen
ATTORNEYS.

INVENTORS.
ALAN I. FRANK
JOHN A. ANGELONI, SR.
JOHN J. McINTYRE
RONALD L. BARACKA
BY
Caesar, Rivise, Bernstein & Cohen
ATTORNEYS.

INVENTORS.
ALAN I. FRANK
JOHN A. ANGELONI, SR.
JOHN J. McINTYRE
RONALD L. BARACKA
BY
Caesar, Rivise, Bernstein & Cohen
ATTORNEYS.

RETROGRESSIVE SCANNING PATTERN

This invention relates generally to character recognition systems and in particular to providing a new and improved scanning pattern for the recognition of characters.

Conventional flying spot optical character recognition systems utilize cathode-ray tubes for providing a progressive scanning pattern over a field containing characters to be recognized. In a progressive scanning pattern the light beam of a flying spot scanner proceeds in a conventional raster form in either a horizontal or vertical direction in a series of either straight vertical or straight horizontal lines. Thus, in a progressive scanning pattern, the light beam proceeds in the horizontal and vertical directions at substantially different speeds. That is, where the scan progresses horizontally at a plurality of vertical positions in order to progress across the scanning field, the light beam progresses horizontally at a very high rate of speed relative to the vertical speed of the beam. A photomultiplier tube directed towards the field scanned produces a signal of varying intensity in accordance with the beam striking either a light or a dark area. Accordingly, as the beam progresses from one area to another, for example, from a light area to a dark area or from a dark area to a light area, a voltage signal produced at the output of the photomultiplier is a transitional voltage. In order to make this voltage usable, it is necessary to electronically adjust the signal by filtering out certain of the frequencies present in the transitional signal.

Since the beam is moving at a much greater velocity in a horizontal direction than in a vertical direction, the transitions from white to black intercepted by a horizontal beam produce a transition signal at a higher frequency than do transitions of the beam in a vertical direction. Therefore, circuitry used to electronically square off the signal produced by the photomultiplier must be able to filter out not only the frequencies for a transition caused by the horizontal movement of the beam, but also by the vertical movement of the beam.

It is therefore an object of the invention to provide a new and improved scanning system whereby the transitional frequency is substantially the same whether it is produced by movement of the beam in a horizontal or vertical direction.

Another object of the invention is to provide a new and improved scanning system for an optical recognition system which scans a field in a retrogressive pattern.

Another object of the invention to provide a new and improved scanning system for an optical recognition system which facilitates the quantization of output signals from the optical head of a character recognition system.

These and other objects of the invention are achieved by providing a new and improved scanning system for use in a character recognition system having means for scanning a field and means responsive to said field for producing signals in accordance with the lightness or darkness of the area or field at which said means for scanning is disposed. Control means are provided for establishing the position on the field that said means for scanning is disposed. The control means causes the scanning means to move in a retrogressive pattern across the field in both a horizontal and vertical direction.

Other objects and many of the attendant advantages of this invention will be readily appreciated as the same becomes better understood by reference to the following detailed description when considered in connection with the accompanying drawings wherein.

Referring now in greater detail to the various figures of the drawing wherein similar reference characters refer to similar parts, an optical character recognition system embodying the invention is shown in FIG. 1.

Figure 1:
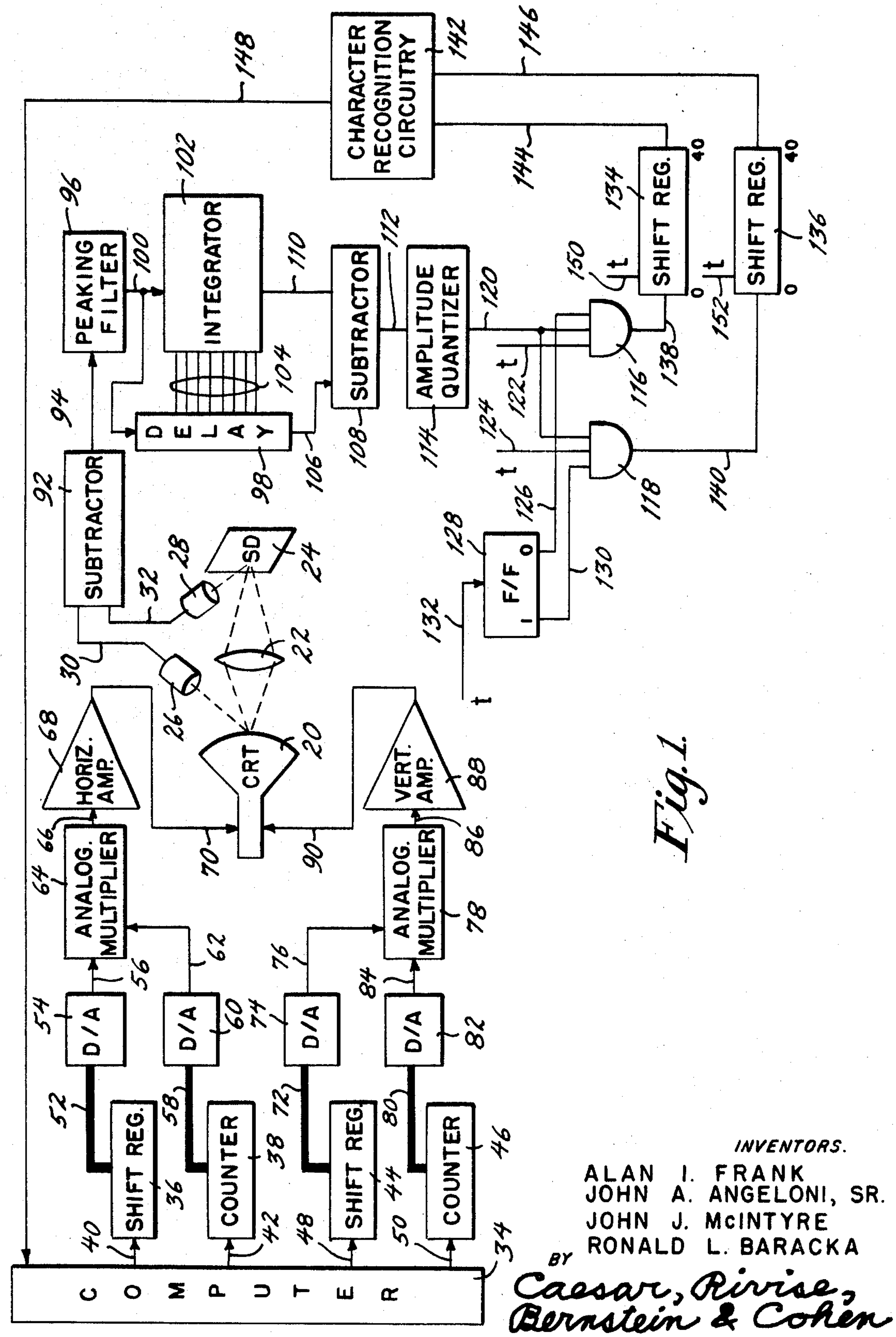
FIG. 1 is a schematic block diagram of an optical character recognition system embodying the invention.

The character recognition system includes a flying spot scanner which includes a cathode-ray tube 20 which provides a movable beam of the light in accordance with the voltage applied to its horizontal and vertical deflection plates.

The beam of light is focused by a lens system 22 onto a document 24, the printed characters of which are read by the optical scanning system. Photomultipliers 26 and 28 are aimed at the cathode-ray tube 20 and document 24, respectively. The output line 30 connected to the photomultiplier tube 26 has a signal provided thereon in accordance with the intensity of the light produced by the cathode-ray tube 20. Similarly, the output line of photomultiplier 28 provides a signal on line 32 in accordance with the intensity of the light deflected from the document 24.

The movement of the light beam in the cathode ray tube 20 is determined by a computer 24. The computer 34 is connected to a shift register 36 and a counter 38 via lines 40 and 42, respectively. The information on lines 40 and 42 from the computer enables the determination of the horizontal deflection of the beam of the cathode-ray tube. Information is also provided by computer 34 to shift register 44 and counter 46 via lines 48 and 50, respectively. The information fed on lines 48 and 50 from the computer is representative of the vertical information for the deflection of the beam in the cathode-ray tube in a vertical direction.

Shift register 36 is connected via cable 52 to a digital to analog converter 54 which converts the digital signal on cable 52 to an analog signal on output line 56 of the digital to analog converter. The output of counter 38 is also fed in parallel via cable 58 to a digital to analog converter 60 which converts the digital signals on cable 58 to an output signal on line 62 thereof.

The digital to analog converter 60 is connected via line 62 to an analog multiplier 64. The digital to analog converter 54 is connected via output line 56 to analog multiplier 64. The signal on line 62 is multiplied by the signal on line 56 to provide a normalized output on output line 66 of the analog multiplier which determines the horizontal deflection during a complete scan raster of the electrons beam of the cathode-ray tube 20. The analog multiplier is connected to a horizontal voltage deflection amplifier 68 via line 66.

The amplifier 68 is connected to the horizontal deflection plates of the cathode-ray tube via line 70. The output of shift register 44 is connected via cable 72 to a digital to analog converter 74. The digital to analog converter is connected via output line 76 to an analog multiplier 78. The output of counter 46 is connected via cable 80 to digital to analog converter 82 which is in turn connected via output line 84 to analog multiplier 78.

The analog multiplier is connected via line 86 to a vertical deflection voltage amplifier 88, the output of which is connected to the vertical deflection plates of the cathode-ray tube 20. The photomultipliers 26 and 28 are connected via lines 30 and 32, respectively, to a subtractor 92 which provides a signal on output line 94 in accordance with the difference in the signals on lines 30 and 32.

Output line 94 is connected to a peaking filter 96. The output of peaking filter 96 is connected via line 100 to a delay line 98 and an integrator 102. The delay line 98 is tapped along its length at eight individual points and the output thereof is connected in parallel via a cable 104 to integrator 102. The delay line is also serially connected via an output line 106 to subtractor 108.

The output of integrator 102 is connected via output line 110 to subtractor 108. The output of subtractor 108 is provided on line 112 which is connected to an amplitude quantizer 114. The output of amplitude quantizer 114 is fed to a pair of gates 116 and 118 via output line 120. The inputs of gates 116 and 118 are also connected to timing signals via lines 122 and 124, respectively. The third input of gate 116 is connected to the zero "0" output line 126 of flip-flop 128. The third input to gate 118 is connected to the one "1" output line 130 of flip-flop 128. Flip-flop 128 also includes a trigger input line 132 which is connected to a source of timing signals in order to change the state of the flip-flop each time a triggering signal is received.

The effect of the gates 116 and 118 and flip-flop 128 is to alternate in a predetermined sequence the samples received from the amplitude quantizer 114 on line 120 for insertion into the shift registers 134 and 136 via lines 138 and 140, respectively. That is, the gates 116 and 118 are alternately enabled by the flip-flop 128 to pass the signal on line 120. Thus, when the first output line 126 is energized, gate 116 is enabled and gate 118 is closed and the amplitude quantizer output signal on line 120 is fed via gate 116 and output line 138 to the shift register 134. When the output line 130 is energized, the output signal on line 120 from the amplitude quantizer is applied via gate 118 to shift register 136. Shift registers 134 and 136 thus each store a column of samples of a scanned area. The information stored in shift registers 134 and 136 are connected to character recognition circuitry 142 via lines 144 and 146, respectively. The character recognition circuitry provides output signals on cable 148 which are applied to the computer 34 in order to evaluate the characters scanned, the information relating to the height of the characters scanned, the area of the documents being scanned and other information inserted for optical recognition.

In operation, information is provided on lines 40 and 48 in digital form to shift registers 36 and 44, respectively, from the computer 34. These signals are representative of the normalization factor that is used to produce scan rasters from the cathode-ray tube 20 which are slightly larger than the size of the characters to be recognized on document 24. The digital signals carrying the normalization information are converted to analog form by the digital to analog converters 54 and 74, respectively.

The cathode-ray tube control signals from the computer are applied via lines 42 and 50 to counters 38 and 46, respectively. The control signals that are fed into counters 38 and 46 enable the counters to provide the output signals in digital form indicative of the location within the scan raster that the output beam of the cathode-ray tube 20 is deflected at any particular time.

Thus, counter 38 provides the digital signal output representative of the location of the horizontal position of the electronic beam in the cathode-ray tube and the counter 46 provides digital signals representative of the vertical position of the electron beam in cathode-ray tube 20. These digital signals are converted to analog form by digital to analog converters 60 and 82, respectively.

The analog multipliers 64 and 78 modify the output signal from lines 62 and 84 in accordance with the normalization signals on lines 56 and 76, respectively. The signal outputs on line 66 and 86 are then amplified by amplifiers 68 and 88 to provide the necessary deflection voltage for the cathode-ray tube 20. The light beam produced by cathode-ray tube 20 is directed to the document 24 by means of the lens 22.

The photomultiplier 28 converts the intensity of the deflected light from the document 24 into a signal on line 32, the amplitude of which corresponds to the intensity of the light deflected from the document. The photomultiplier 26 converts the intensity of the beam from the cathode-ray tube into an electrical signal corresponding in amplitude to the intensity of the light beam produced by the cathode-ray tube. The subtractor 92 thereby provides a difference signal between the reference signal on line 30 corresponding to the light emitted from the cathode-ray tube 20 and the deflected intensity signal on line 32 corresponding to the light deflected from the field on the document which is scanned.

The output signal on line 94 is therefore not dependent on the intensity of the light at the output of the cathode-ray tube 20 to provide a signal which corresponds to the lightness and darkness of the portion of document 24 which is recognized. The subtractor 92 feeds this signal to a peaking filter 96 via line 94 which electronically adjusts the signal on line 94 to provide a squarer output signal to delineate changes caused by the light beam passing from either a light to a dark area or from a dark area to a light area of the document.

Figure 6:
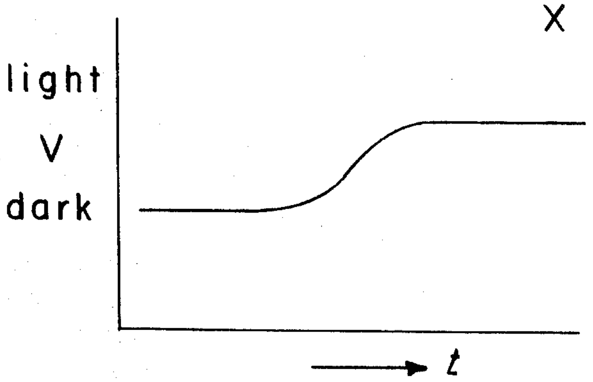
FIG. 6 is a graphical representation of the typical output of a photomultiplier tube when the flying spot scanner is in the transition of passing from a dark to a light portion on a document.
Figure 7:
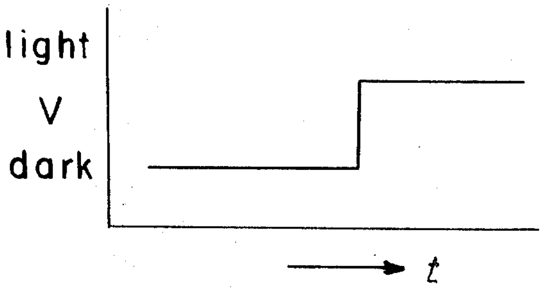
FIG. 7 is a graphical representation of the ideal transitional voltage produced by a photomultiplier when the flying spot scanner is in the transition of passing from a dark to a light portion of a document.
Figure 8:
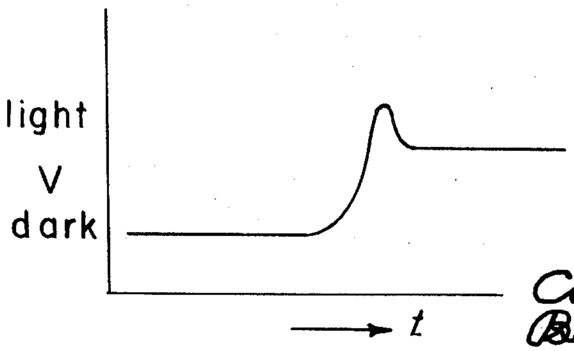
FIG. 8 is a graphical representation of the actual transitional voltage produced by the photomultiplier tube after it has been electrically adjusted by a peaking filter.

Referring to FIG. 6 which is a graphical plot of the voltage amplitude of the signal on line 94 against time which is normally produced as a result of a transition from a dark to a light area is a slow rising signal. A transition from a light to a dark area is similar but with a negative going slope. Ideally, the signal on line 94 illustrated in FIG. 6 should look like the squared off waveform in FIG. 7 which is also a graphical plot of the signal voltage against time. In order to square off the signal, it is therefore necessary to filter out undesirable harmonics which are present in the signal shown in FIG. 6. The peaking filter 96 includes such a filter and electronically adjusts the signal shown in FIG. 6 to a signal like that shown in FIG. 8 which is also a graphical representation of voltage against time.

The peaking filter 96 provides the electronically adjusted signal to delay line 98 and to an integrator 102. The integrator thereby provides an output signal on line 110 which is a time integration of the last 8 bits which were received by the delay line 98. This signal on line 110 is fed to subtractor 108. The signal from the peaking filter is also applied to subtractor 108 via line 106 but delayed eight units of time by delay line 98. The subtractor thereby provides a signal on line 112 which is normalized by the darkness of the document scanned. That is, the darkness of the area adjacent the area which has been sampled is effectively normalized by subtracting the average darkness of an area from the darkness signal at a particular point.

The normalized signal is provided by line 112 to the amplitude quantizer 114 which produces a binary signal on line 120 which in effect considers an area scanned to be either dark or light depending on the amplitude of the signal on line 112. The signal on line 120 is fed to gates 116 and 118 and depending on the gate enabled, is placed into the shift register 134 or 136.

The shift registers 134 and 136 are connected to character recognition circuitry 142 which determines the characters scanned by the cathode-ray tube 20. The height of the characters plus the type of font is also determined by the character recognition circuitry which provides the information to the computer for providing the normalization informations to the shift registers 134 and 136.

As will hereinafter be seen, the shift registers 134 and 136 receive the binary bits from lines 120 in an alternating pattern so that each shift register effectively registers a column of sample areas of a scan raster. Thus, two columns, of bits are substantially simultaneously developed and placed in the shift registers 134 and 136.

Figure 2:
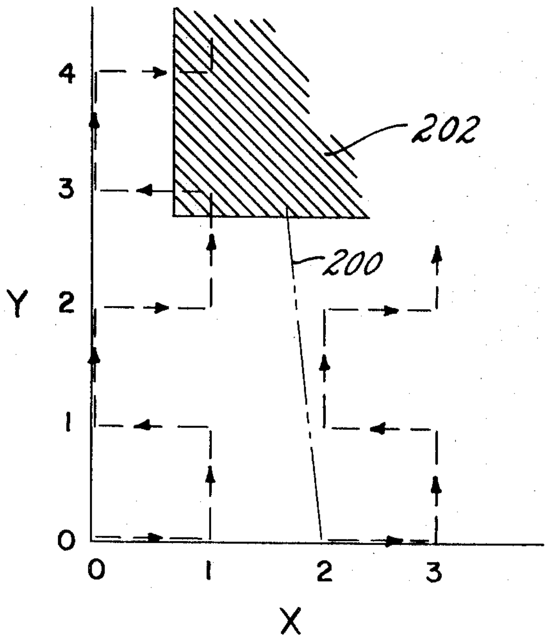
FIG. 2 is a fragmentary diagrammatic view of a field scanned for the purpose of showing the principle of this invention.

The movement of the light beam within a character scan raster over a document is diagrammatically illustrated in FIG. 2. The location over which the light beam passes is shown by dotted lines which include arrow heads to illustrate the direction of travel. It can therefore be seen that the beam progresses along a retrogressive path. That is, the beam starts at reference and proceeds positively in the $x$ direction until it has travelled one unit. It is then moved positively in the $y$ direction until it has proceeded one unit. The beam then retrogresses or moves negatively one unit in the $x$ direction along the one unit line in the $y$ direction. Thus, the position at which the beam is located after three units of time would be at zero "0" units along the $x$ axis and at one "1" unit along the $y$ axis (hereinafter referred to as 0,1. For ease of reference, all coordinates hereinafter referred to will have only the absolute units of the $x$ and $y$ coordinates specified in that order).

The beam will thus zigzag in the manner shown until it reaches the verticalmost unit which the scan raster encompasses. When the uppermost portion of the scan raster has been reached, the light beam returns along dotted line 200 to the position 2,0. The light beam then proceeds in a zigzag fashion between the transverse limits of the column until it reaches the upper limit of the raster again. A scan raster embodying the invention is thus comprised of a plurality of retrogressive sweeps. In the preferred embodiment, the scan raster comprises a plurality of retrogressive columns.

As the scan raster proceeds, it is effectively sampled at the corners of the zigzag by being quantized at the times that the signal produced by the photomultiplier is at these points. That is, the signal is sampled corresponding to the location of the light beam at the points 0,0, 1,0, 1,1, 0,1, 0,2, 1,2, etc. It can thus be seen that two columns of quantized points are generated in one vertical scan.

As seen in FIG. 2, a dark area 202 is intercepted when the beam passes from the point 1,2 to the point 1,3. A transitional signal is produced on the output signal of photomultiplier tube 28 as the beam passes from the light area to the darkened area 202. Similarly, a transition takes place at the same rate when the beam passes from the location 0,4 to the point 1,4. The transitional signal is thus produced at the same rate in both the horizontal and vertical transitions.

In conventional systems, the slope of the transitional signal produced by the photomultiplier tube by the movement of the beam in a vertical direction is far more gradual than the signal produced by movement in a horizontal direction. Thus, in a conventional system, the undesirable frequencies which would be filtered out of the signal produced by a horizontal transition in order to provide the electronically adjusted signals shown in FIG. 8 would be in a different electromagnetic spectrum than the signals filtered out for a vertical transition. Also, the bandwidths of the frequency components in the vertical and horizontal transitions are different. It is thus necessary to pass the vertical transitions and the horizontal transitions through different peaking filters in order to properly electronically adjust the signals. Further, temporary storages to preserve the horizontal lines in order to determine vertical transitions are obviated.

Extra peaking filters are obviated in the instant system embodying the invention by the retrogressive scanning pattern which passes through vertical and horizontal transitions at the same rate.

Figure 3:
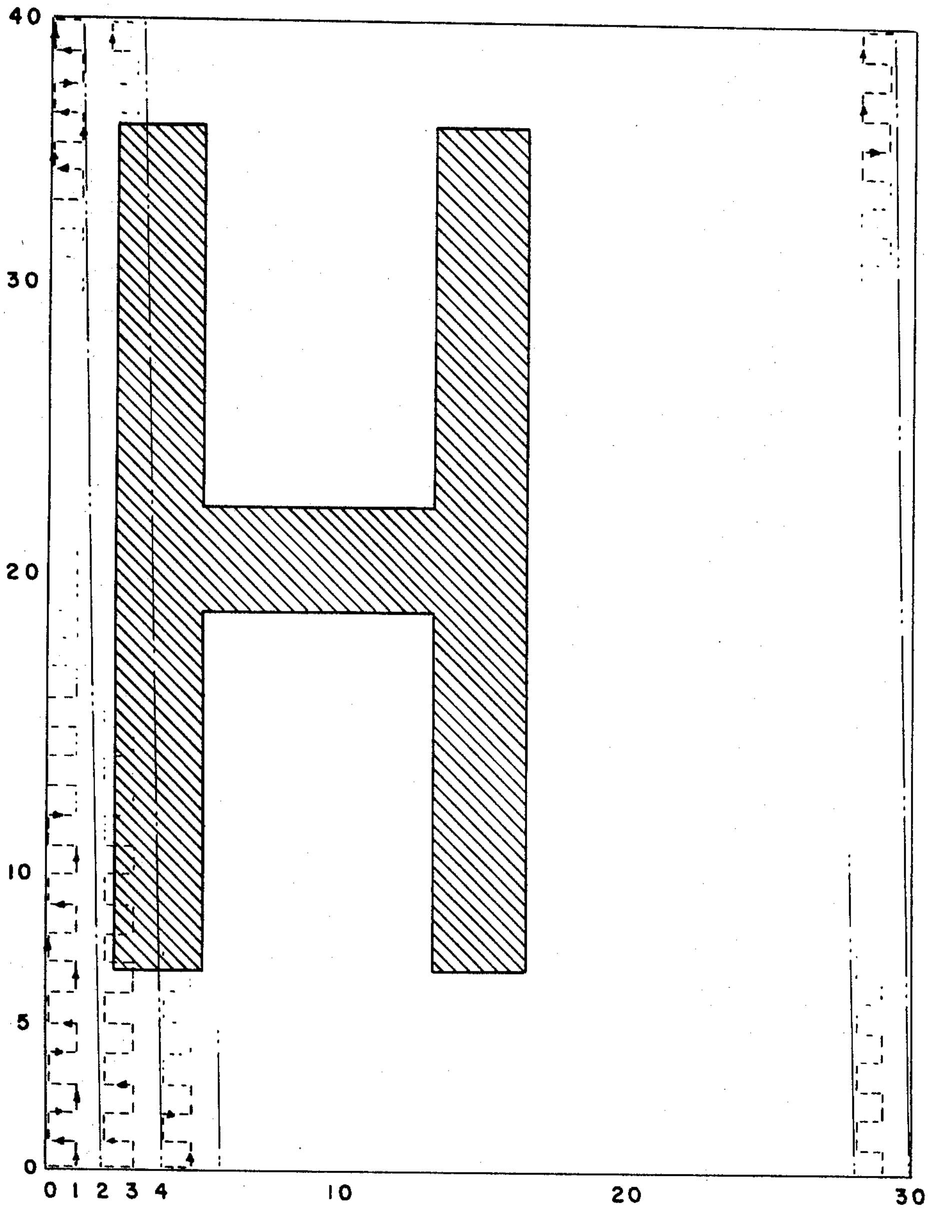
FIG. 3 is a diagrammatic representation of a field scanned in accordance with the scanning system embodying the invention.

Referring now to FIG. 3, which shows the retrogressive scanning pattern as applied to a scanning raster which is 40 by 30 units. The size of the units are, of course, determined by the length and width of the largest characters in a font. The electron beam would scan a 40 unit by 30 unit area by starting from the 0,0 coordinate and proceeding to the 1,0 coordinate, etc. in the same manner as shown in FIG. 2. The retrogressive scanning pattern proceeds up the column until the coordinate 1,40 is reached whereby the light beam retraces to the coordinate 2,0 thereby starting another column.

As seen, a letter H is located within the scan raster diagrammatically depicted in FIG. 3. It can be seen that the lowermost corner of the letter H is first intercepted by the light beam when passing from coordinate 3,6 coordinate 3,7. The transitions continue to be provided along the entire left vertical edge of the H thereby providing information to the character recognition system which more accurately enables the character recognition circuitry to recognize the left-hand edge of the letter H.

As the second column of retrogressive tracing is completed, the light beam retraces to coordinate 4,0 and a third retrogressive column is produced. Each retrogressive column acts to produce two columns of samples. Since the points along the retrogressive column and sampled successively, the amplitude quantizer quantizes the points in the first retrogressive column at the following coordinate points in the following sequence: 0,0, 1,0 1,1, 0,1...0,39, 0,40, 1,40. In order to organize these quantized points spatially, the gates 116 and 118 are controlled by flip-flop 128 in such a manner that shift register 124 receives the bits taken at the following quantized points: 0,0, 0,1, 0,2, 0,3, 0,4...0,39, 0,40; and the shift register 136 receives the bits taken at the following points: 1,1, 1,2, 1,3, 1, 4...1,39, 1,40. Thus, the 82 samples taken in the first retrogressive column are divided equally into the two registers.

It can therefore be seen that the flip-flop 128 quantized triggered on every odd timing unit. That is, during a first timing unit, the output line 126 is energized so that the first quantized bit is provided to shift register 134. At the end of the first timing unit, a triggering pulse is applied via line 132 to the trigger input of flip-flop 128 thereby energizing output line 130. The gate 118 is thereby enabled and the second quantized bit is passed to shift register 136. The flip-flop 128 remains in the same state through the third timing unit thereby enabling the third bit also to be placed in shift register 136. At the end of the third unit, the flip-flop 128 again receives a triggering pulse on line 132 thereby changing the state of the flip-flop 128 so that line 126 is again energized and the fourth quantized bit is thereby applied to shift register 134.

The shift registers 134 and 136 include shift inputs 150 and 152, respectively, which receive timing pulses only when the associated gates 116 and 118 are enabled thereby shifting 41 bits into each of the shift registers. After 82 bits have been quantized by the quantizer 114, the shift register are each loaded with a complete column. These columns of quantized bits are transferred into the character recognition circuitry whereby they are used with the remaining bits determined in a complete scan raster to identify the character scanned within the raster. Thus, after the registers 134 and 136 have been loaded 15 times, a complete raster has been scanned.

Figure 4:
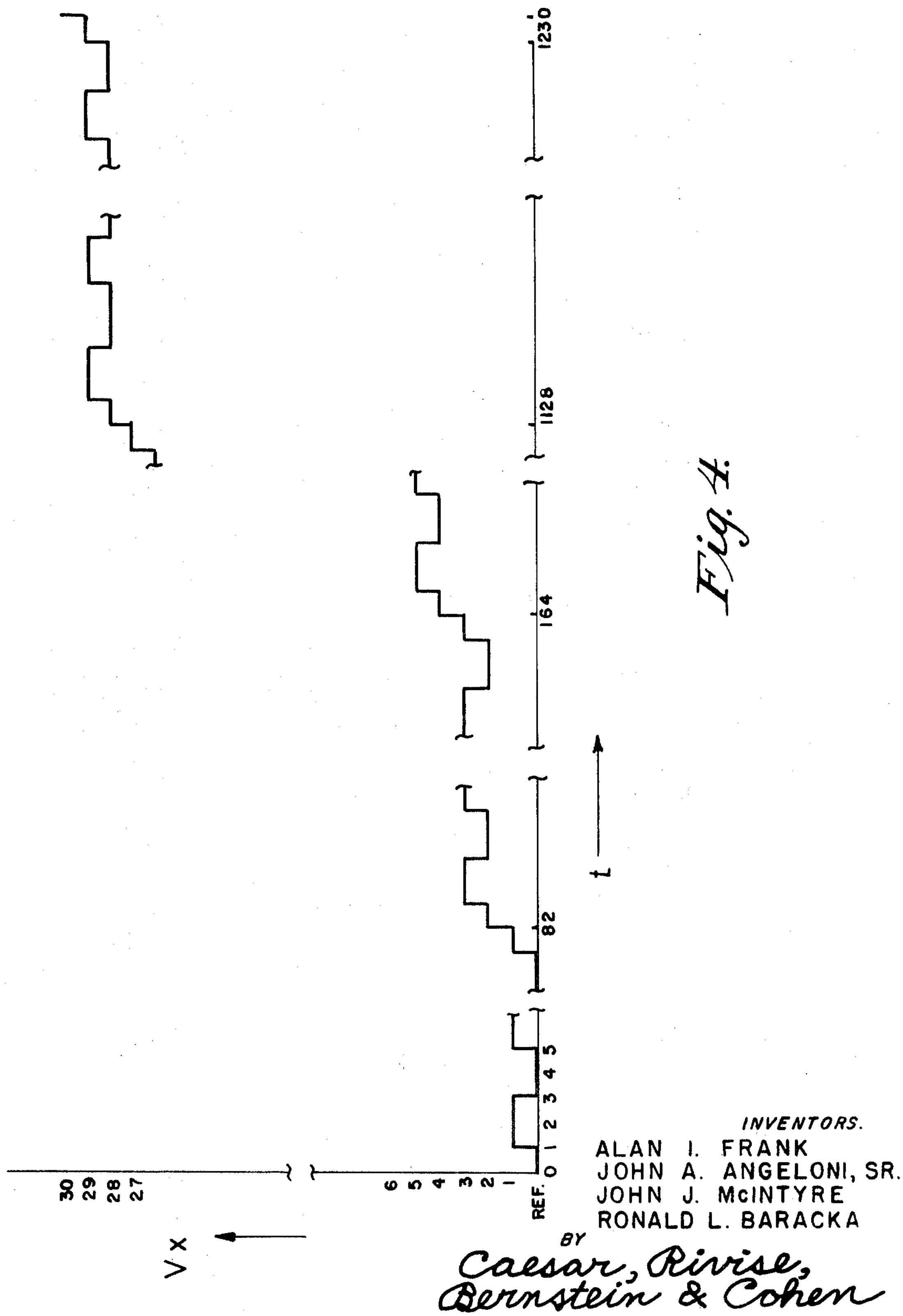
FIG. 4 is an idealized graphical representation of the horizontal deflection voltage applied to the cathode-ray tube.

The voltage applied to the horizontal deflection plates is graphically depicted in FIG. 4. The graph in FIG. 4 shows the amplitude of the voltage during the timing units of a scan raster that is applied to the horizontal deflection plates of a cathode-ray tube. During the first 82 time units, the voltage alternates between reference voltage and one unit of voltage. The units are of course, dependent on the amount of voltage necessary to deflect the beam of the cathode-ray tube. The voltage, as can be seen, is at reference during the first timing unit and is raised to 1 volt at the end of the first time unit. The voltage remains at one unit for two time units and is then lowered to reference voltage. Through the remainder of the time units defining the first retrogressive column of a scan raster, the voltage continues to switch between reference and one unit at the end of every odd unit of time. At the end of the 82nd time unit, the voltage rises to 2 volts which acts as a reference voltage for a one unit voltage oscillation through to the end of the 164th time unit.

Thus, equivalently after each 82 time units (which define a retrogressive column), the reference voltage is raised 2 volts and the signal therefore oscillates between one unit of voltage as it does during the first 82 units of time in a scan raster. This continues until the 15th retrogressive column is completed wherein a one unit oscillation is produced during the 15th column with 28 volts being used as a reference.

Figure 5:
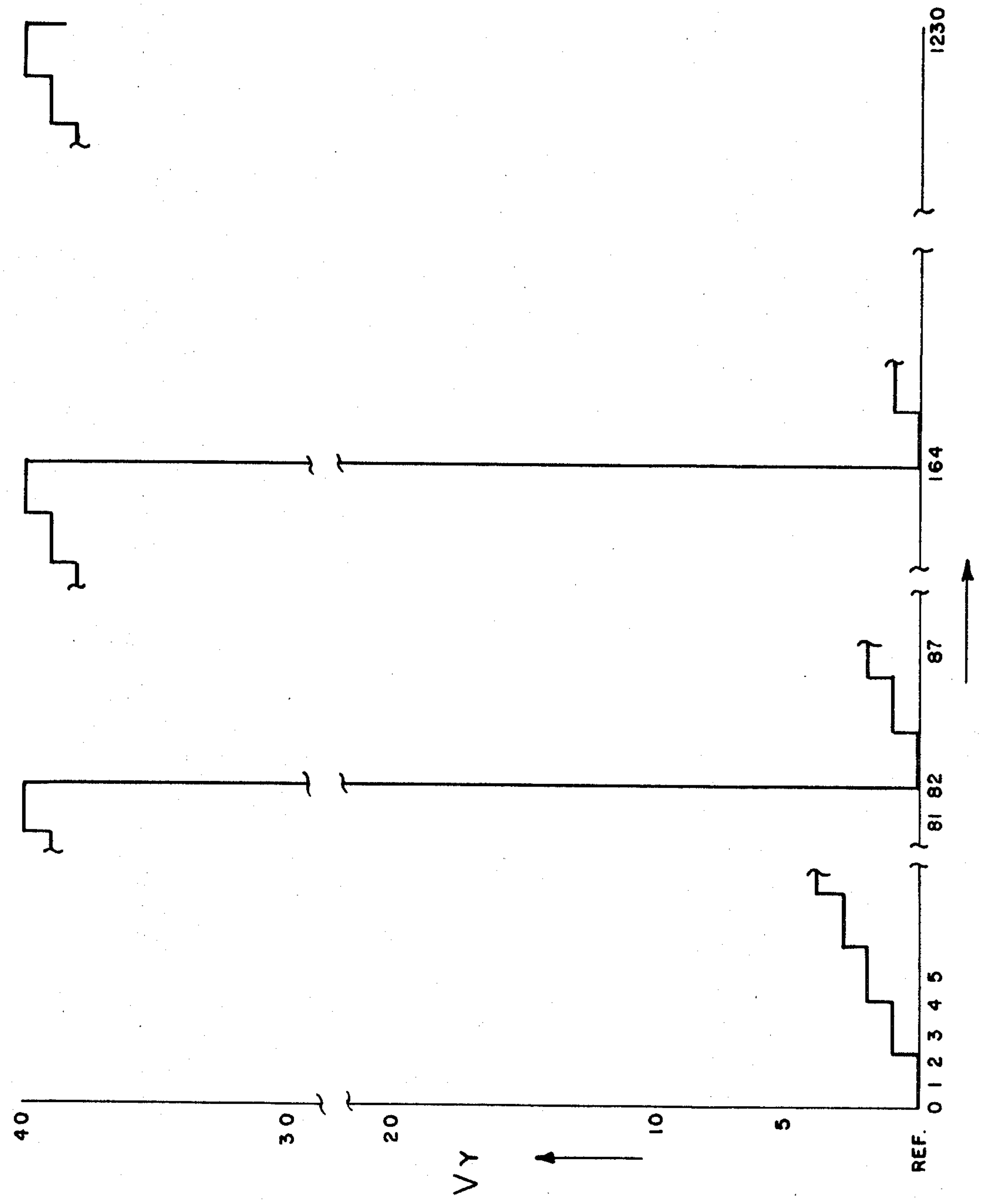
FIG. 5 is an idealized graphical representation of the vertical deflection voltage applied to the cathode-ray tube.

The deflection voltage applied to the vertical deflection plates of the cathode-ray tube 20 is graphically depicted in FIG. 5. FIG. 5 is an idealized graphical representation of the voltage during the 1200 timing units of a scan raster. As can be seen in FIG. 5, the voltage for the first two time units is at reference voltage. After two time units, the voltage increases to 1 volts above reference for another two time units. After four time units, the voltage increases to two voltage units above reference and so on so that there are 40 unit increases in voltage during the 82 units of a retrogressive scanning column. After the 82nd time unit, the voltage drops to reference voltage thereby causing a retrace in the scanning pattern. As can be seen, the voltage also increases in a staircase fashion during the second 82 time units until the end of the retrogressive column is reached. The voltage again drops to reference and so on throughout the 1230 time units of a scan raster.

It can therefore be seen that the scanning pattern is retrogressive in both a horizontal and a vertical direction during a single scan raster.

Referring back to FIG. 3, it can be seen that the scan raster which is shown in dotted line proceeds vertically as the pattern goes positively and negatively in the $x$ direction along the first column. As soon as the scan raster reaches the top of the raster, the beam retraces back to the bottom of the raster again to proceed with another vertical column in which the electron beam oscillates between two and three units in the $x$ direction and so on until 15 double columns have been formed of scanned points. A new scan raster is then started.

Figure 9:
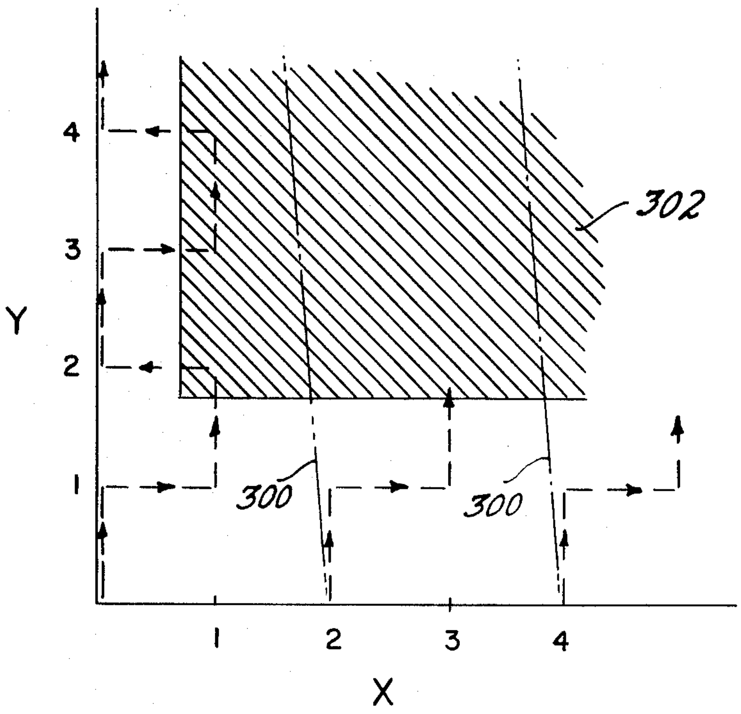
FIGS. 9 and 10 are fragmentary diagrammatic views of a field scanned in alternate retrogressive scanning patterns embodying the invention.

An alternate retrogressive scanning pattern is diagrammatically illustrated in FIG. 9 which depicts the movement of the light beam within a scan raster over a document. The path over which the beam passes is shown in dotted lines. The scan pattern shown in FIG. 9 is similar to the pattern shown in FIG. 2. However, the beam proceeds from reference (0,0) not in the $x$ direction, but in the $y$ direction until it reaches point 0,1 after one unit of time. The beam then changes direction and moves in the $x$ direction to point 1,1. The beam then moves in the $y$ direction to point 1,2 whereupon it retrogresses in the $x$ direction and moves to point *0,2*.

The beam therefore zigzags in the same manner as the beam in FIG. 2 until it reaches the verticalmost unit which the raster encompasses and is then returned along dotted line 300. A new zigzag column is then started as the light beam proceeds from point 2,0 to point 2,1, and then to point 3,2 and so on until a second retrogressive column is produced. That is, the column is produced by the oscillation of the beam between two and three units in the $x$ direction and until the verticalmost portion of the scan raster is reached, whereupon the beam returns along line 300 in order to produce a third retrogressive column.

As seen in the figure, the lowermost horizontally extending edge of a dark area 302 is vertically intercepted when the beam passes from point 1,1 to point 1,2 and the leftmost vertically extending edge of the area 302 is horizontally intercepted when the beam passes from point 1,2 to 0,2 and from 0,3 to 1,3 and so on. It can therefore be seen that as in the retrogressive pattern of FIG. 2, the beam will pass through vertical and horizontal transitions at the same speed thereby producing transition signals within the same electromagnetic frequency spectrum.

The corners of the zigzag patterns are sampled as the scan raster proceeds thus causing of the generation of two columns of quantized points. Because of the retrogressive movement of the beam, the transitions of the beam from light to dark areas and dark to light areas proceed at the same rate whether in a vertical or a horizontal direction.

Figure 10:
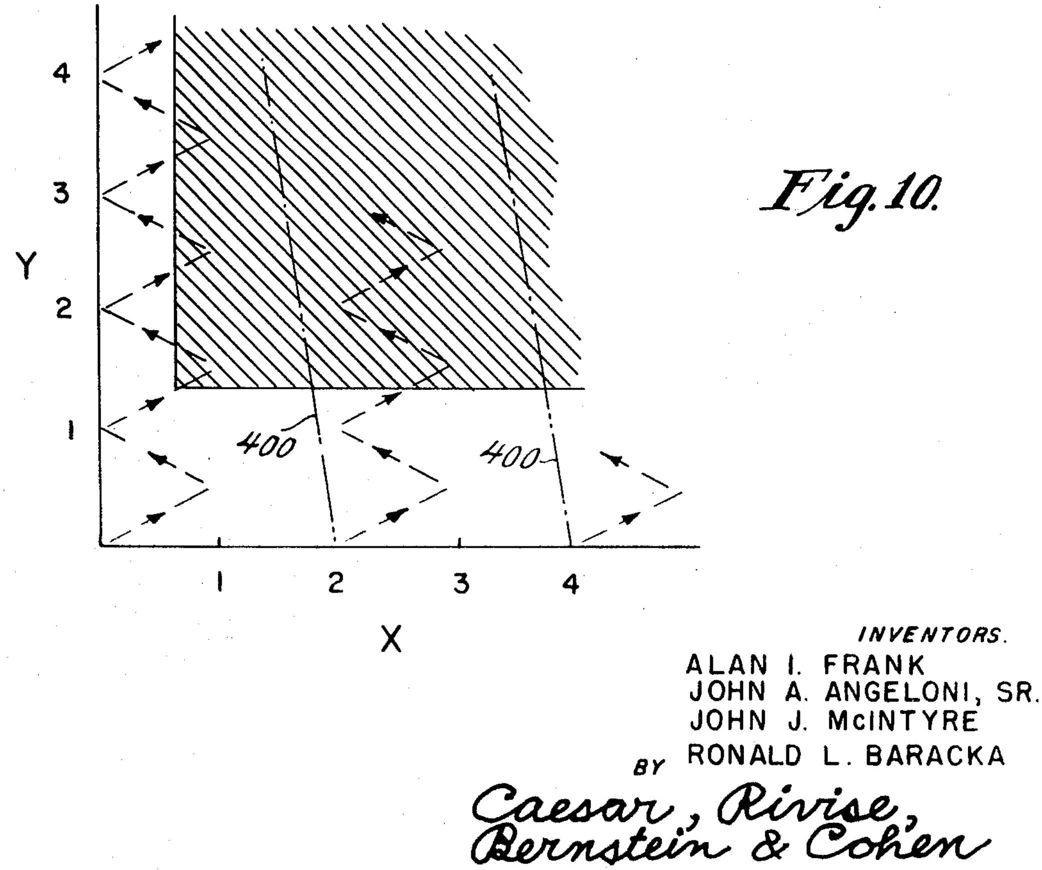

Another alternate retrogressive scanning pattern is diagrammatically illustrated in FIG. 10 which also depicts the movement of a light beam within a scan raster over a document. The path over which the beam passes is shown in dotted lines. Whereas the scan patterns shown in FIGS. 2 and 9 have proceeded substantially in the direction of the coordinate axes, the retrogressive scanning pattern shown in FIG. 10 proceeds in a diagonal zigzag form. That is, the light beam starts from reference (0,0) in a straight line to point 1½. The beam changes direction and retrogresses in the $x$ direction and moves in a straight line to point 0,1. the light beam thus moves vertically at the uniform rate of one-half unit per time unit and oscillates between 0 and 1 in the $x$ direction until the beam has reached the verticalmost unit which the raster encompasses and is then returned along dotted line 400 to point 2,0. A second retrogressive column is then formed in the same pattern proceeding one-half unit vertically per time unit with an oscillation between two and three units in the $x$ direction. The second retrogressive column is completed as the beam reaches the verticalmost unit of the scan pattern and returns along line 400 to point 4,0 to proceed with a third retrogressive vertical scan. As in the previous retrogressive scanning pattern, the corners of the zigzag pattern are sampled as the scan raster proceeds vertically thus causing the generation of two columns of quantized points. It can be seen that horizontal and vertical transitions proceed at the same rate. That is, the vertical and horizontal edge of a darkened area 402 are intercepted at the same rate whether the edge is vertical or horizontal. Thus, for example, the beam proceeds through a horizontal edge when the beam is travelling from point 2,1 to point 3,1½ at the same rate as the beam moving through a vertical edge from point 0,2 to point 1,2½.

It can therefore be seen that the retrogressive nature of the scan pattern shown enables vertical and horizontal transitions to be generated at the same rate. It should also be understood that the retrogressive scanning patterns embodying the invention may proceed not only in retrogressive columns, but the retrogressive sweeps may also be in retrogressive rows. That is, by rotating the diagrammatic illustrations 90° in FIGS. 2, 9 and 10, it can be seen that a scan raster embodying the invention may also comprise a plurality of horizontal retrogressive rows.

The retrogressive nature of the scan raster enables the scanning pattern to proceed through a vertical or a horizontal transition at the same speed. This enables the signals to be electronically adjusted by a peaking filter having a relatively narrow bandwidth.

Quantization and recognition are thereby enhanced. Moreover, there is more usable information generated for use in the character recognition circuitry since both vertical and horizontal lines in a character are readily determined.

Without further elaboration, the foregoing will so fully illustrate my invention that others may, by applying current or future knowledge, readily adapt the same for use under various conditions of service.

We claim:

1. In a character recognition system having means for scanning a field, said scanning means being moved to form a scan raster comprised of a plurality of retrogressive sweeps and means responsive to said field for producing signals in accordance with the lightness or darkness of the area of the field at which said means for scanning id disposed, control means for establishing the position on said field where said means for scanning is disposed, said control means causing said scanning means to move in said plurality of retrogressive sweeps, said means responsive being sampled when said scanning means is disposed at points at which the scanning means changes direction, said scanning means changing direction at the transverse limits of said retrogressive sweeps, said system further including means for quantizing said sampled signals so that said sampling causes the sequential generation of quantized signals representative of two columns of points within said field, a first and second shift register, a selection means and a pair of gates, each of said gates having a first input connected to said means for quantizing and a second input connected to said selection means, each of said shift registers being connected to the output of a different one of said gates, said selection means enabling said gates in alternating fashion so that after a retrogressive column has been scanned, each of said registers has received and stores the signals representing one column of said points.

2. The invention of claim 1 wherein said scanning means moves in a substantially coordinate oriented zigzag pattern to provide retrogressive sweeps wherein said beam oscillates between horizontal and vertical limits throughout the scan raster.

3. The invention of claim 2 wherein said retrogressive sweeps are in vertical columns, and said means for scanning is moved retrogressively with said column in a horizontal direction.

4. The invention of claim 1 wherein said scanning means moves in an oscillatory diagonal direction within a retrogressive sweep.

UNITED STATES PATENT OFFICE

CERTIFICATE OF CORRECTION

Patent No. 3,593,284 Dated July 13, 1971

Alan I. Frank,
John A. Angeloni, Sr.,
John J. McIntyre
and
Ronald L. Baracka

It is certified that errors appear in the above-identified patent and that said Letters Patent are hereby corrected as shown below:

(1) Column 2, line 21 after the word "of" delete "the".

(2) Column 2, line 34 "24" should be --34--.

(3) Column 2, line 58 "electrons" should be --electron--.

(5) Column 6, line 5 "and" should be --are--.

(6) Column 6, line 17 "quantized" should be --is--.

(7) Column 7, line 58 after the word "causing" delete "of".

(8) Column 8, line 14 "edge" should be --edges--.

(9) Column 8, line 51 "id" should be --is--.

Signed and sealed this 11th day of January 1972.

(SEAL)
Attest:

EDWARD M.FLETCHER,JR.
Attesting Officer

ROBERT GOTTSCHALK
Acting Commissioner of Patents